US012250246B2

(12) United States Patent
Rakshit et al.

(10) Patent No.: US 12,250,246 B2
(45) Date of Patent: Mar. 11, 2025

(54) PERFORM EDGE PROCESSING BY SELECTING EDGE DEVICES BASED ON SECURITY LEVELS

(71) Applicant: International Business Machines Corporation, Armonk, NY (US)

(72) Inventors: Sarbajit K. Rakshit, Kolkata (IN); Venkata Vara Prasad Karri, Visakhapatnam (IN); Subha Kiran Patnaikuni, Visakhapatnam (IN); Saraswathi Sailaja Perumalla, Visakhapatnam (IN); Sri Harsha Varada, Vizianagaram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 17/483,656

(22) Filed: Sep. 23, 2021

(65) Prior Publication Data
US 2023/0090200 A1    Mar. 23, 2023

(51) Int. Cl.
*H04L 9/40* (2022.01)
*G06N 20/00* (2019.01)

(52) U.S. Cl.
CPC .............. *H04L 63/20* (2013.01); *G06N 20/00* (2019.01); *H04L 63/102* (2013.01); *H04L 63/104* (2013.01)

(58) Field of Classification Search
CPC ..... H04L 63/20; H04L 63/102; H04L 63/104; H04L 63/105; G06N 20/00
See application file for complete search history.

(56) References Cited

U.S. PATENT DOCUMENTS 10,462,171 B2    10/2019  Weingarten et al.
11,153,175 B2 *  10/2021  Bijavara Aswathanarayana
                          Rao ........................ G06N 5/047
(Continued)

FOREIGN PATENT DOCUMENTS

CN    107770263    12/2019
CN    111459665    7/2020
(Continued)

OTHER PUBLICATIONS

Yu, Wei, et al. "A survey on the edge computing for the Internet of Things." IEEE access 6 (2017): 6900-6919. (Year: 2017).*
(Continued)

*Primary Examiner* — Jung W Kim
*Assistant Examiner* — Sameera Wickramasuriya
(74) *Attorney, Agent, or Firm* — KONRAD, RAYNES, DAVDA & VICTOR LLP; Janaki K. Davda

(57) ABSTRACT

Provided are techniques for performing edge processing by selecting edge devices based on security levels. A security policy is identified for a job to determine a security level for the data. A number of the edge devices that are to be included in a participating group to execute the job is identified. A subset of edge devices that meet the security level are identified by comparing security data of each of the edge devices with the security level. In response to determining that the subset of edge devices includes that number of edge devices, the edge devices from the subset are added to the participating group. The job is executed using the edge devices in the participating group and the one or more cloud nodes, while maintaining the security level in processing the data and in communications across the edge devices and the one or more cloud nodes.

20 Claims, 8 Drawing Sheets

(56) References Cited

U.S. PATENT DOCUMENTS

| | | | | |
|---|---|---|---|---|
| 11,210,578 | B2* | 12/2021 | Scheidegger | G06N 3/086 |
| 11,347,970 | B2* | 5/2022 | Anghel | G06N 3/045 |
| 11,443,132 | B2* | 9/2022 | Yellin | G06F 18/285 |
| 2003/0177386 | A1* | 9/2003 | Cuomo | G06F 21/6227 |
| | | | | 713/193 |
| 2006/0271658 | A1* | 11/2006 | Beliles | G08B 25/08 |
| | | | | 709/223 |
| 2007/0157307 | A1* | 7/2007 | Katoh | H04L 63/105 |
| | | | | 726/14 |
| 2007/0280211 | A1* | 12/2007 | Malueg | H04L 65/1026 |
| | | | | 370/356 |
| 2013/0101291 | A1* | 4/2013 | Wittenschlaeger | |
| | | | | H04L 63/0209 |
| | | | | 370/254 |
| 2017/0060574 | A1* | 3/2017 | Malladi | H04W 4/38 |
| 2017/0063905 | A1* | 3/2017 | Muddu | G06N 7/01 |
| 2017/0235603 | A1* | 8/2017 | Baughman | G06Q 10/101 |
| | | | | 718/105 |
| 2019/0392328 | A1* | 12/2019 | Gil Bulacio | H04L 41/14 |
| 2022/0292221 | A1* | 9/2022 | Sohail | H04L 63/105 |

FOREIGN PATENT DOCUMENTS

| | | |
|---|---|---|
| CN | 107959708 | 10/2020 |
| CN | 112306673 | 2/2021 |
| WO | WO2017066936 | 4/2017 |
| WO | 2020068238 | 4/2020 |
| WO | 2021036265 | 3/2021 |

OTHER PUBLICATIONS

B. R. Kandukuri, R. P. V. and A. Rakshit, "Cloud Security Issues," 2009 IEEE International Conference on Services Computing, Bangalore, India, 2009, pp. 517-520, doi: 10.1109/SCC.2009.84. (Year: 2009).*

Zhang, Yanyong, et al. "Impact of workload and system parameters on next generation cluster scheduling mechanisms." IEEE Transactions on Parallel and Distributed Systems 12.9 (2001): 967-985. (Year: 2001).*

Gao et al. "A Light-weight Trust Mechanism for Cloud-Edge Collaboration Framework" dated Oct. 31, 2019, 2019 IEEE 27th International Conference on Network Protocols (ICNP), Total 6 pages.

J. Deal, "NXP Launches Flexible IoT Cloud Platform to Securely Manage and Connect Edge Devices" dated Feb. 3, 2021, NXP Semiconductors Press Release, Total 3 pages.

Xu et al., "A Collaborative Cloud-Edge Computing Framework in Distributed Neural Network" dated Oct. 26, 2020, EURASIP Journal on Wireless Communications and Networking vol. 2020, Total 17 pages.

L. Eliot "Edge Computing And The Cloud Are Perfect Pairing For Autonomous Vehicles" dated Mar. 30, 2021, (online) retrieved from the Internet at URL>Edge Computing And The Cloud Are Perfect Pairing For Autonomous Vehicles (forbes.com) Total 13 pages.

"Role of Edge Computing in Connected and Autonomous Vehicles" dated Jan. 24, 2020, (online) retrieved from the Internet at URL>https://www.einfochips.com/blog/role-of-edge-computing-in-connected-and-autonomous-vehicles/, Total 13 pages.

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

* cited by examiner

PERFORM EDGE PROCESSING BY SELECTING EDGE DEVICES BASED ON SECURITY LEVELS

BACKGROUND

Embodiments of the invention relate to performing edge processing by selecting edge devices based on security levels.

Many companies store, manage, and analyze data on a centralized storage, typically in a public cloud or private cloud environment. However, traditional infrastructure and cloud computing may not be able to meet the requirements for many real life applications.

Edge computing may be described as a distributed computing concept that integrates intelligence to edge devices and allows data to be processed and analyzed in real time at the edge device, which is near the data collection source. In edge computing, data may not be uploaded directly to a cloud infrastructure or to a centralized data processing system.

SUMMARY

In accordance with certain embodiments, a computer-implemented method is provided for performing edge processing by selecting edge devices based on security levels. The computer-implemented method comprises operations. It is determined that a job that uses one or more cloud nodes and uses edge devices to process data is to be executed. A security policy is identified for the job to determine a security level for the data. A number of the edge devices that are to be included in a participating group to execute the job is identified. A subset of edge devices that meet the security level are identified by comparing security data of each of the edge devices with the security level. In response to determining that the subset of edge devices includes that number of edge devices, the edge devices from the subset are added to the participating group. The job is executed using the edge devices in the participating group and the one or more cloud nodes, while maintaining the security level in processing the data and in communications across the edge devices in the participating group and the one or more cloud nodes.

In accordance with other embodiments, a computer program product is provided for performing edge processing by selecting edge devices based on security levels. The computer program product comprises a computer readable storage medium having program code embodied therewith, the program code executable by at least one processor to perform operations. It is determined that a job that uses one or more cloud nodes and uses edge devices to process data is to be executed. A security policy is identified for the job to determine a security level for the data. A number of the edge devices that are to be included in a participating group to execute the job is identified. A subset of edge devices that meet the security level are identified by comparing security data of each of the edge devices with the security level. In response to determining that the subset of edge devices includes that number of edge devices, the edge devices from the subset are added to the participating group. The job is executed using the edge devices in the participating group and the one or more cloud nodes, while maintaining the security level in processing the data and in communications across the edge devices in the participating group and the one or more cloud nodes.

In accordance with yet other embodiments, a computer system is provided for performing edge processing by selecting edge devices based on security levels. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. It is determined that a job that uses one or more cloud nodes and uses edge devices to process data is to be executed. A security policy is identified for the job to determine a security level for the data. A number of the edge devices that are to be included in a participating group to execute the job is identified. A subset of edge devices that meet the security level are identified by comparing security data of each of the edge devices with the security level. In response to determining that the subset of edge devices includes that number of edge devices, the edge devices from the subset are added to the participating group. The job is executed using the edge devices in the participating group and the one or more cloud nodes, while maintaining the security level in processing the data and in communications across the edge devices in the participating group and the one or more cloud nodes.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For any contextual situation in which edge computing participation is desired, along with cloud computing, embodiments identify the number of edge devices, the security level desired for processing at each of the edge devices, and ensure that the security level and the level of trust between the edge devices is met. In this manner, embodiments ensure security between the combination of the computation at the edge devices the and the computation at the cloud devices.

Figure 1:
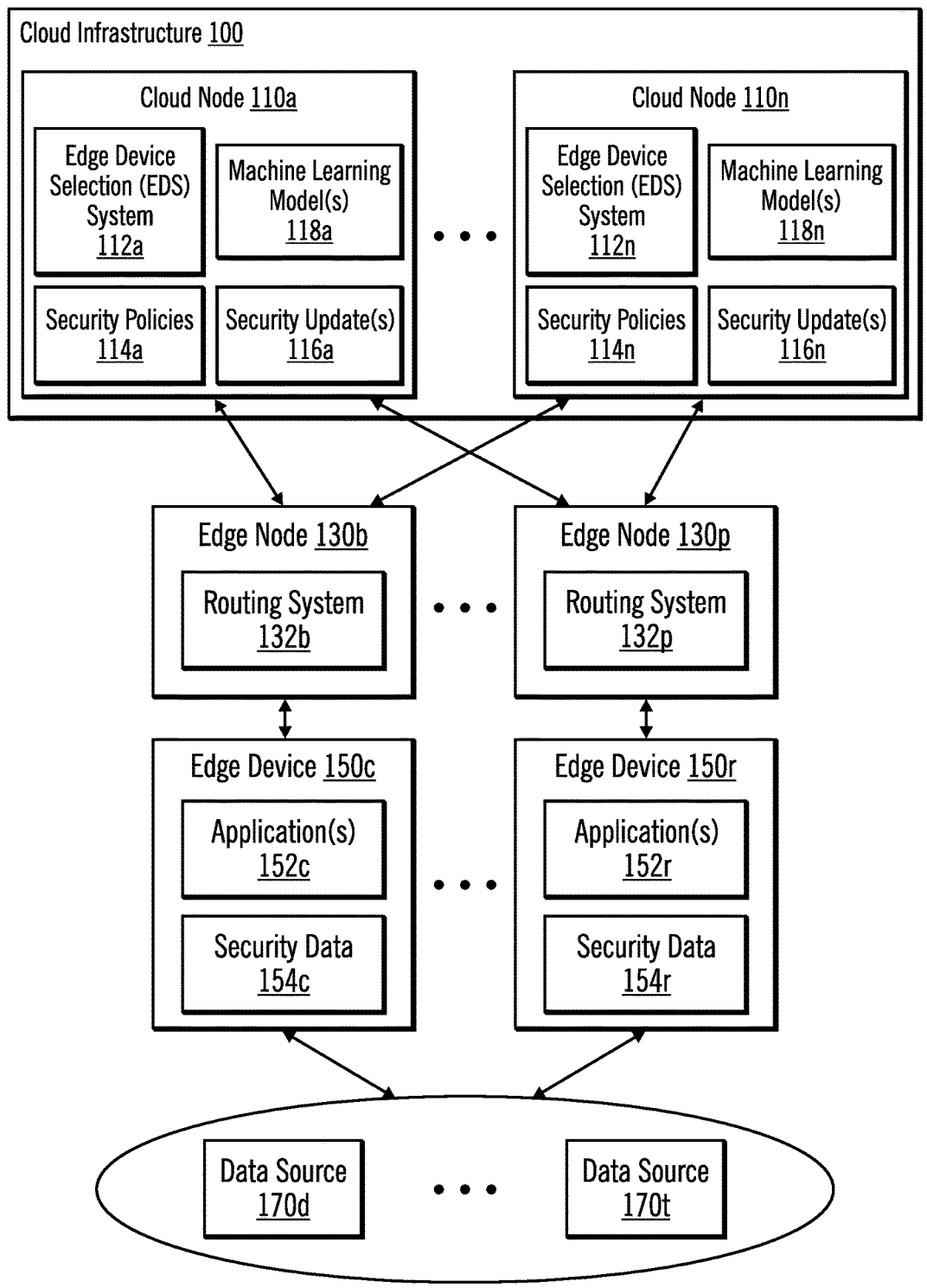
FIG. 1 illustrates, in a block diagram, a computing environment in accordance with certain embodiments.

FIG. 1 illustrates, in a block diagram, a computing environment in accordance with certain embodiments. A cloud infrastructure 100 includes one or more cloud nodes 110a . . . 110n. The one or more cloud nodes 110a . . . 110n are connected (e.g., via a network) to edge nodes 130b . . . 130p. The edge nodes 130b . . . 130p are connected (e.g., via a network) to the edge devices 150c . . . 150r.

Each of the cloud nodes 110a . . . 110n includes an Edge Device Selection (EDS) system 112a . . . 112n, one or more security policies 114a . . . 114n, one or more security updates 116a . . . 116n, and one or more machine learning models 118a . . . 118n. Each of the security policies 114a . . . 114n indicates the security level that edge devices 150c . . . 150r should have for particular computations. For example, for computing a medical bill (which may have sensitive information for a patient), the security level may be 10 out of 10 levels, while, for computing a driving route (which uses traffic data), the security level may be 5 out of 10 levels. The security levels may correspond to particular security mechanisms to maintain confidentiality of data (e.g., redacting data, encrypting data, etc.). In certain embodiments, if an edge device 150c . . . 150r does not have the desired security level, the cloud node 110 may send a security update 116a . . . 116n to the edge device 150c . . . 150r so that the edge device 150c . . . 150r may implement that security update 116a . . . 116n and be at the desired security level. In certain embodiments, the security update 116a . . . 116n includes software (e.g., another application) and configuration data for the software to update the security level of the edge device 150c . . . 150r. In certain embodiments, the security update 116a . . . 116n includes code and configuration data to update the security level of an existing application 152c . . . 152r. In certain embodiments, a machine learning model 118a . . . 118n is a selection machine learning model and is used to select edge devices 150c . . . 150r. In certain embodiments, a machine learning model 118a . . . 118n is a classification machine learning model and is used to classify data. In certain embodiments, different edge devices 150c . . . 150r may be able to process data of different classifications (e.g., a first edge device 150c . . . 150r processes medical data, while a second edge device 150c . . . 150r processes public data (e.g., map data)).

Each of the edge nodes 130b . . . 130p includes a routing system 132b . . . 132p to route data between the cloud node 110a . . . 110n and the edge devices 150c . . . 150r. Each of the edge devices 150c . . . 150r includes one or more applications 152c . . . 152r and security data 154c . . . 154r. The edge devices 150c . . . 150r are connected (e.g., via a network) to data sources 170d . . . 170t. The applications 152c . . . 152r on the edge devices 150c . . . 150r receive and process data from the data sources 170d . . . 170t.

In certain embodiments, the edge devices 150c . . . 150r are computers, smartphones, etc. In certain embodiments, the data sources 170d . . . 170t are sensors (e.g., of a car, on clothing, on buildings, on roads, etc.), Internet of Things (IoT) devices, Internet of Everything (IoE) devices, data stores, databases, etc. A set of data from the data sources 170d . . . 170t may be described as including one or more data elements.

Embodiments work with IoT and IoE environments, which provide a highly available network with minimal latency to process large amounts of data in real time, which may not be possible on a traditional Information Technology (IT) infrastructure.

Embodiments employ edge computing, which may also be referred to as fog computing. Edge computing may be described as the deployment of computing resources (e.g., outside a data center in a cloud infrastructure), close to the point of activity that the computing supports. The edge devices 150c . . . 150r may be a series of connected edge devices 150c . . . 150r that also link to users or processes, such as IoT devices and IoE devices. Deployment of an edge device 150c . . . 150r may have a different security level than the physical security of the data center of a cloud node 110a . . . 110n, where the cloud node 110a . . . 110n has certain access, network, and data security measures that are applied by the software or hardware that reside at the cloud node. The EDS system 112a . . . 112n selects the edge devices 150c . . . 150r to perform processing based on security levels available at the edge devices 150c . . . 150r. In certain embodiments, because each of the cloud nodes 110a . . . 110n includes the EDS system 112a . . . 112n, when the cloud nodes 110a . . . 110n are working together, one of them is designated to select the edge devices 150c . . . 150r with the desired security level.

In edge computing, when the edge devices 150c . . . 150r communicate with each other while performing edge computations with a desired security level, the edge devices 150c . . . 150r avoid data being impacted by a lack of the appropriate security level.

When the edge devices 150c . . . 150r and the cloud nodes 110a . . . 110n are exchanging data with each other, the EDS system 112a . . . 112n ensures proper security among the participating edge devices as per a security policy that is defined in the cloud node.

In certain embodiments, based on the context (e.g., the type of processing being done and/or the type of data being processed), the EDS system 112a . . . 112n determines that one or more cloud nodes 110a . . . 110 and edge devices 150c . . . 150r will perform processing of the data together. The EDS system 112a . . . 112n determines what the security level should be at the edge devices 150c . . . 150r and how many edge devices 150c . . . 150r are to be included in the processing. Then, the EDS system 112a . . . 112n validates the edge devices 150c . . . 150r to determine which of them meet the security level. For the edge devices 150c . . . 150r that meet the security level, the EDS system 112a . . . 112n adds some or all of these edge devices 150c . . . 150r to a participating group to meet the desired number of edge devices 150c . . . 150r. If there are not enough edge devices 150c . . . 150r that meet the security level, the EDS system 112a . . . 112n sends a security update to one or more of the edge devices 150c . . . 150r so that they are at the security level and adds these to the participating group of edge devices 150c . . . 150r to meet the number of edge devices 150c . . . 150r desired. In this manner, the EDS system 112a . . . 112n ensures that the desired security level is enabled or installed on the edge devices 150c . . . 150r. The participating group of edge devices 150c . . . 150r refers to the edge devices 150c . . . 150r that will be working with the one or more cloud nodes 110a . . . 110n to perform certain processing.

The EDS system 112a . . . 112n recognizes each and every participating edge device and will be validating if the devices are having appropriate security as per the policy defined for the required computation, and accordingly be identifying appropriate configuration with the participating edge devices.

With embodiments, while performing edge computation, before allowing an edge device 150c . . . 150r to participate in the edge computing, the EDS system 112a . . . 112n validates the security level installed in the edge device 150c . . . 150r.

Based on the available security data 154c . . . 154r of the edge devices 150c . . . 150r, the EDS system 112a . . . 112n identifies which data may be sent to each of the edge devices 150c . . . 150r for edge computation.

During edge computation, if the EDS system 112a . . . 112n determines that the security level desired for continuing processing has moved from a higher security level to a lower security level, the EDS system 112a . . . 112n allows additional edge devices that have that lower security level to participate in the edge computing. In certain embodiments, the EDS system 112a . . . 112n also alters the security policy to indicate that the lower security level is desired. For example, if financial data is to be analyzed, then the highest security level is used. On the other hand, if a queue length of a customer is to be analyzed, then a comparatively lower security level may be used. In certain embodiments, the highest security level may be multi-level security (in which case the data is processed at different security levels for a job), and the lowest level security may be a single level of security.

During edge computation, if the EDS system 112a . . . 112n determines that the security level desired for continuing processing has moved from a lower security level to a higher security level, the EDS system 112a . . . 112n determines whether the edge devices 150c . . . 150r in the participating group meet the higher security level and may remove or add edge devices 150c . . . 150r to the participating group. In certain embodiments, the EDS system 112a . . . 112n also alters the security policy to indicate that the lower security level is desired.

In certain embodiments, once the edge computing is completed, the EDS system 112a . . . 112n notifies any edge devices that received a security update 116a . . . 116n to uninstall that security update 116a . . . 116n. In this manner, the EDS system 112a . . . 112n uninstalls (withdraws) the deployed security updates that correspond to the desired security policy 114a . . . 114n on the participating edge devices 150c . . . 150r.

In certain embodiments, the EDS system 112a . . . 112n classifies the data (e.g., IoT data of an electric vehicle) and associates a security level with the classification. The, the EDS system 112a . . . 112n may determine whether to send the data to a particular edge device 150c . . . 150r based on the classification of that data. For example, the data may be classified as data used for communication, which has a high security level, and static data, which has a lower security level. The lower security level may indicate that no security is needed. For example, for an electric vehicle that is an edge device, if the electric vehicle has installed a security update and is able to process data at a certain security level, and the electric vehicle meets the desired security level for handling data of a particular classification, then the EDS system 112a . . . 112n may encrypt the data and send the encrypted data to the electric vehicle for edge computations.

The classification of the data may be achieved using artificial intelligence and a machine learning model, which receives data as input and outputs a classification of the data (e.g., communication data, static data, etc.) with an assigned weight. In certain embodiments, the EDS system 112a . . . 112n provides visualization of impact on data related operations, where the visualization is an indication of the classification of particular data and the security level associated with that classification. The visualization may be provided as a list, in a graph, etc. In certain embodiments, a job may process data having data elements that have different classifications, and the different classifications may be associated with different security levels. For example, for data that includes a data element of an address of a public park and an address of an individual at the park, the address of the public park may be have a lower security level than the address of the individual.

Figure 2:
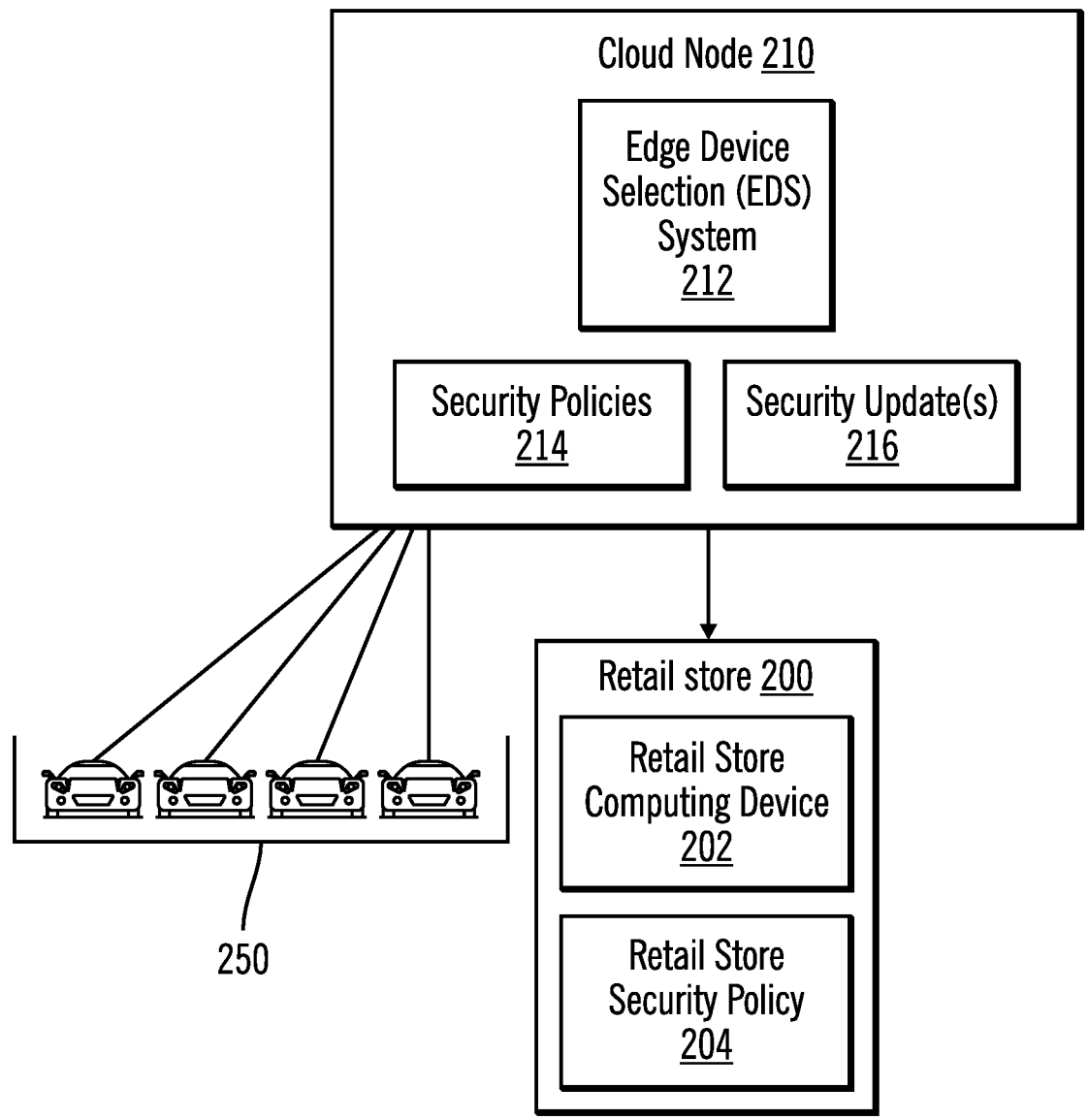
FIG. 2 illustrates an example using a set of autonomous vehicles in accordance with certain embodiments.

FIG. 2 illustrates an example using autonomous vehicles in accordance with certain embodiments. In FIG. 2, a retail store computing device 200 is coupled to a cloud node 200, and the cloud node 200 is coupled to the autonomous vehicles 250. The cloud node 200 includes an EDS system 212, one or more security policies 214, and one or more security updates 216. The autonomous vehicles 250 are edge devices that include applications and security data, and these autonomous vehicles 250 are parked beside the retail store. The retail store computing device 250 communicates with the cloud node 200 to implement a cloud solution, and the retail store computing device 250 includes a retail store security policy 204. The autonomous vehicle 250 are to participate in edge computing for the retail store 200.

The EDS system 212 receives the retail store security policy 204 from the retail store computing device 202. The, the EDS system 212 checks the security policy of each of the autonomous vehicles 250 to select autonomous vehicles whose security policy matches the retail store security policy 204. In this manner, the EDS system 212 ensures that the security level of the autonomous vehicles that participate in edge computing for the retail store 200 match the desired retail store security policy 204. In certain embodiments, if the security policy of an autonomous vehicle does not match the retail store security policy 204, the EDS system 212 sends the autonomous vehicle a security update 216, which the autonomous vehicle implements so that the security policy of the autonomous vehicle matches the retail store security policy 204, and the autonomous vehicle is able to participate in edge computing for the retail store 200.

An application at each of the autonomous vehicles 250 receives traffic information and retail data from the retail store 200, via the EDS system 212. Then, the application at each of the autonomous vehicles 250 performs edge computing using that traffic data and the retail data, and the output is sent, via the EDS system 212, to the retail store computing device 202, which benefits the retail store 200. In return, each of the autonomous vehicles may earn some points per a points policy.

Figure 3A:
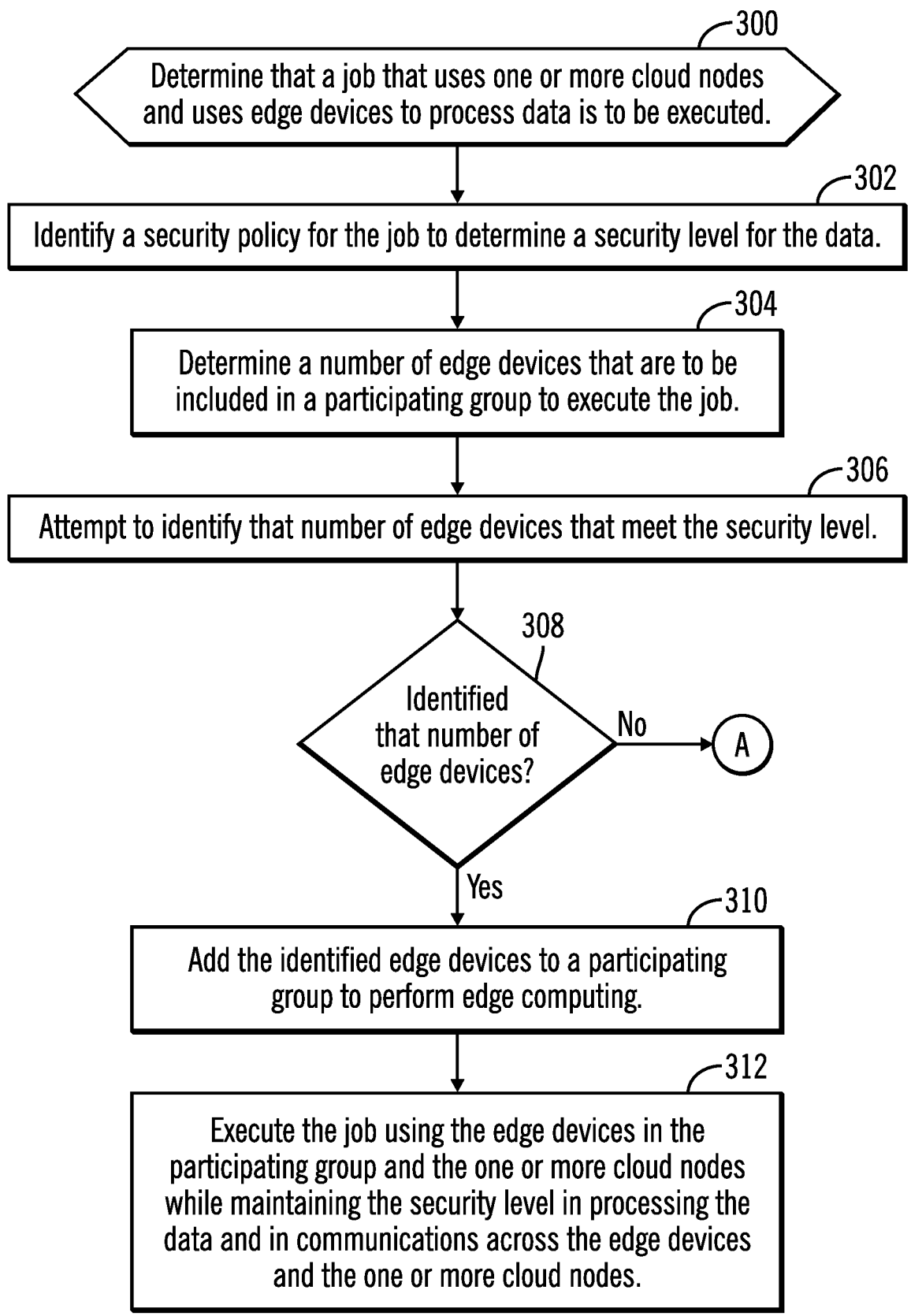
FIGS. 3A and 3B illustrate, in a flowchart, operations for performing edge computing with selected edge devices in accordance with certain embodiments.
Figure 3B:
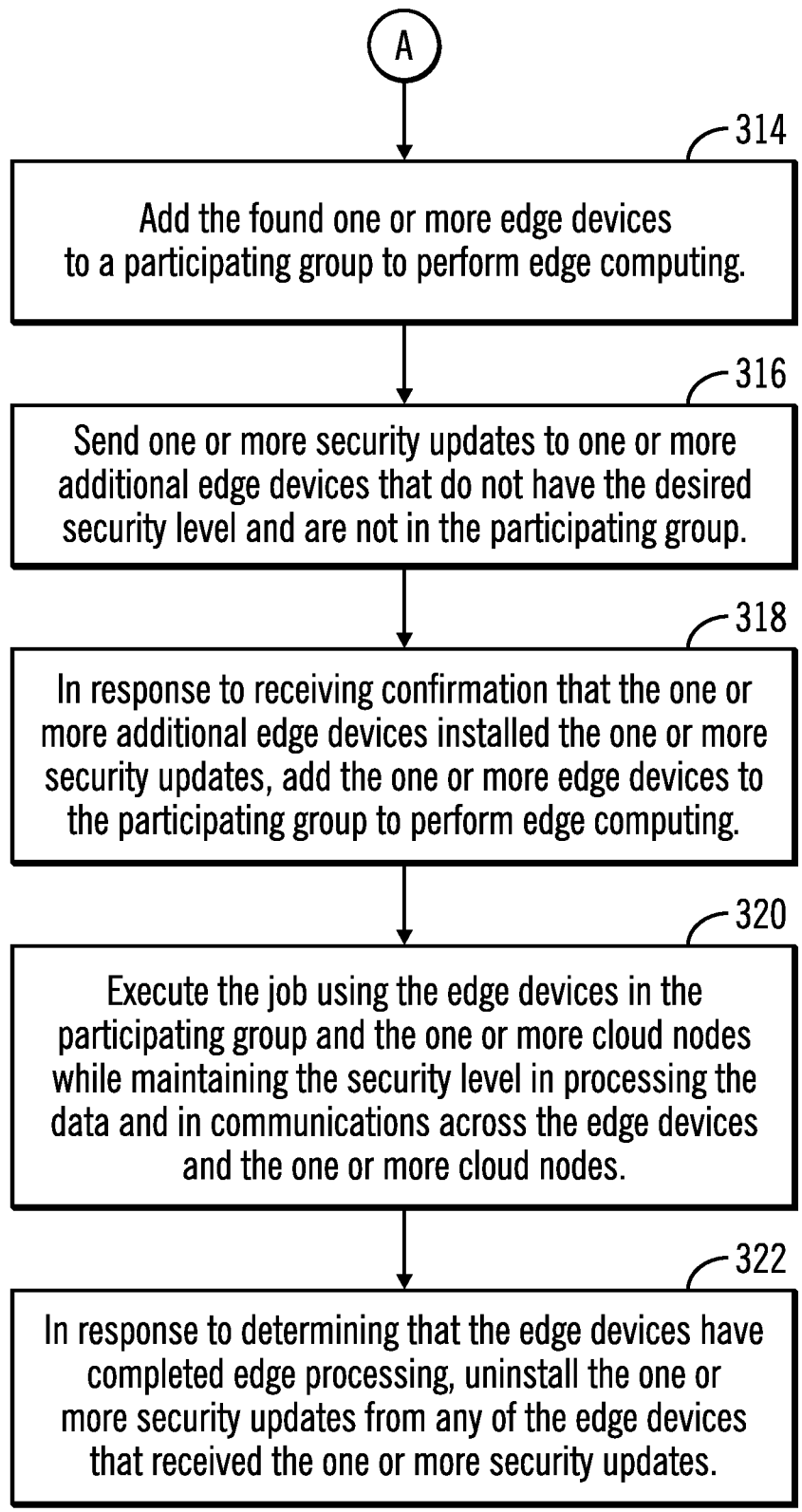

FIGS. 3A and 3B illustrate, in a flowchart, operations for performing edge computing with selected edge devices in accordance with certain embodiments. Control begins at block 300 with the EDS system 112a . . . 112n determines that a job that uses one or more cloud nodes 110a . . . 110n and uses (multiple) edge devices 150c . . . 150r to process data is to be executed.

In block 302, the EDS system 112a . . . 112n identifies a security policy 114a . . . 114n for the job to determine a security level for the data. The security policy 114a . . . 114n may already be stored at a cloud node 110a . . . 110n and associated with the job or may be retrieved from another entity (e.g., a retail store, a business, etc.) and associated with the job.

In block 304, the EDS system 112a . . . 112n determines a number of edge devices 150c . . . 150r that are to be included in a participating group to execute the job. That is, the EDS system 112a . . . 112n determines how many edge devices 150c . . . 150r are to be selected (e.g., 10 edge devices 150c . . . 150r, 100 edge devices 150c . . . 150r, etc.). In certain embodiments, the number of edge devices may be a pre-defined number associated with metadata for the job. In certain embodiments, the number of edge devices may be automatically determined by the EDS system 112a . . . 112n based on how quickly a result is desired and based on the processing capabilities of the edge devices 150c . . . 150r.

In block 306, the EDS system 112a . . . 112n attempts to identify (find) that number of edge devices 150c . . . 150r that meet the security level. This determination is made by comparing the security policy 114a . . . 114n with the security data 154c . . . 154r of each of the edge devices 150c . . . 150r. In certain embodiments, the EDS system 112a . . . 112n first checks which of the edge devices 150c . . . 150r are available for selection.

In block 308, the EDS system 112a . . . 112n determines whether that number of edge devices 150c . . . 150r that have the security level have been identified (found). If so, processing continues to block 310, otherwise, processing continues to block 314 (FIG. 3B).

In block 310, the EDS system 112a . . . 112n adds the identified (found) edge devices 150c . . . 150r to a participating group to perform edge computing. The identified edge devices 150c . . . 150r may be described as a subset of edge devices 150c . . . 150r. In block 312, the EDS system 112a . . . 112n executes the job using the edge devices 150c . . . 150r (for edge computations) in the participating group and the one or more cloud nodes 110a . . . 110n (for cloud computations) while maintaining the security level in processing the data and in communications across the edge devices 150c . . . 150r and the one or more cloud nodes 110a . . . 110n. In certain embodiments, the security level is maintained in communications among edge devices 150c . . . 150r, between edge devices 150c . . . 150r and cloud nodes 110a . . . 110n, and amoun cloud nodes 110a . . . 110n.

In block 314, the EDS system 112a . . . 112n adds the identified one or more edge devices 150c . . . 150r to a participating group to perform edge computing. For example, if the desired number of edge devices 150c . . . 150r is 25, and so far 15 have been identified, the EDS system 112a . . . 112n attempts to find 10 more edge devices 150c . . . 150r.

In block 316, the EDS system 112a . . . 112n sends one or more security updates 116a . . . 116n to one or more additional edge devices 150c . . . 150r that do not have the desired security level and are not in the participating group. The one or more additional edge devices 150c . . . 150r are ones to be added to the participating group so that the total number of edge devices 150c . . . 150r in the participating group equals the determined number of edge devices 150c . . . 150r (from block 304). In certain embodiments, the EDS system 112a . . . 112n sends the one or more security updates 116a . . . 116n to the determined number of additional edge devices 150c . . . 150r (e.g., if 10 additional edge devices 150c . . . 150r are desired, then EDS system 112a . . . 112n sends the one or more security updates 116a . . . 116n to 10 additional edge devices 150c . . . 150r). In certain embodiments, the EDS system 112a . . . 112n sends the one or more security updates 116a . . . 116n to more than the desired number of edge devices edge devices 150c . . . 150r in case some of the edge devices 150c . . . 150r are not able to install the one or more security updates 116a . . . 116n (e.g., if 10 additional edge devices 150c . . . 150r are desired, then EDS system 112a . . . 112n sends the one or more security updates 116a . . . 116n to 15 additional edge devices 150c . . . 150r).

In block 318, in response to receiving confirmation that the one or more additional edge devices 150c . . . 150r installed the one or more security updates 116a . . . 116n, the EDS system 112a . . . 112n adds the one or more additional edge devices 150c . . . 150r to the participating group to perform edge computations. In certain embodiments, the processing of blocks 316-318 is repeated until the total number of edge devices 150c . . . 150r in the participating group equals the determined number of edge devices 150c . . . 150r (from block 304).

In block 320, the EDS system 112a . . . 112n executes the job using the edge devices 150c . . . 150r (for edge computations) in the participating group and the one or more cloud nodes 110a . . . 110n (for cloud computations) while maintaining the security level in processing the data and in communications across the edge devices 150c . . . 150r and the one or more cloud nodes 110a . . . 110n. In certain embodiments, the security level is maintained in communications amoun edge devices 150c . . . 150r, between edge devices 150c . . . 150r and cloud nodes 110a . . . 110n, and among cloud nodes 110a . . . 110n.

In block 322, in response to determining that the edge devices 150c . . . 150r have completed edge processing, the EDS system 112a . . . 112n, uninstalls the one or more security updates 116a . . . 116n from any of the edge devices 150c . . . 150r that received the one or more security updates 116a . . . 116n.

In certain embodiments, the security policies 114a . . . 114n may be defined for different types of data, different data sources, different computational requirements, different security levels, different numbers of edge devices, etc.

In certain embodiments, the EDS system 112a . . . 112n executes a particular cloud computation as defined by the security policy for the context of that particular cloud computation. The context may describe the type of processing being done, the type of data being processed, a prioritization of the data, a category of recommendations, etc.

In certain embodiments, for a particular context, if edge devices are to perform edge computing while working with one or more cloud nodes 110a . . . 110n that perform the cloud computations, then the EDS system 112a . . . 112n identifies which of the edge devices 150c . . . 150r may participate in the edge computing and identifies which data is to be part of this edge computing. That is, based on the context of the activity, the EDS system 112a . . . 112n identifies which of the edge devices 150c . . . 150r may participate in the edge computing.

In certain embodiments, the EDS system 112a . . . 112n identifies edge devices 150c . . . 150r that make themselves available for selection to participate in edge computation. For example, at a particular time, a particular edge device 150c . . . 150r may already be doing other edge computing, may be performing local processing, or otherwise may not be available for selection. In such embodiments, the particular edge device 150c . . . 150r may set an indicator to indicate whether or not the particular edge device 150c . . . 150r is available for selection to participate in edge computing, and the EDS system 112a . . . 112n may check this indicator when selecting edge devices 150c . . . 150r.

In certain embodiments, during edge computing, multiple edge devices 150c . . . 150r communicate with each other to perform edge computations.

In certain embodiments, the EDS system 112a . . . 112n receives security data 154c . . . 154r from each participating edge device 150c . . . 150r and evaluates a desired security policy against that security data 154c . . . 154r. That is, the EDS system 112a . . . 112n identifies the participating edge devices 150c . . . 150r that are aligned with the security policy 114a ... 114n and creates a network among the participating edge devices 150c ... 150r.

In certain embodiments, if the EDS system 112a ... 112n determines that an edge device 150c ... 150r does not have the desired security level, the EDS system 112a ... 112n determines how the security level may be updated so that the edge device 150c ... 150r may be selected for participation in edge computing. In certain embodiments, this includes the EDS system 112a ... 112n installing appropriate software and configuration data so that the edge device 150c ... 150r may perform the edge computation at the desired security level.

In certain embodiments, based on the security level described in the security policy 114a ... 114n, the EDS system 112a ... 112n identifies which data may be processed with the edge devices 150c ... 150r and one or more of the cloud nodes 110a ... 110n together and which data may be processed just by the one or more cloud nodes 110a ... 110n. In certain embodiments, once the data that the edge devices 150c ... 150r may process is identified, the edge devices 150c ... 150r select appropriate data from the data sources 170d ... 170t for edge computation. Thus, if there is data that the edge devices 150c ... 150r are not to process, the edge devices 150c ... 150r do not select that data from the data sources 170d ... 170t for edge computation.

In certain embodiments, while edge computing is in progress, if additional edge devices 150c ... 150r are newly identified (by the EDS system 112a ... 112n) and available for edge computations, then the EDS system 112a ... 112n validates whether the newly identified edge devices 150c ... 150r may be added to the participating group of edge devices 150c ... 150r for edge computing. Then, the EDS system 112a ... 112n adds the newly identified and validated edge devices 150c ... 150r to the participating group for edge computing.

With embodiments, the EDS system 112a ... 112n also sends data to the edge devices 150c ... 150r for edge computing. Thus, the edge devices 150c ... 150r for edge computing may receive data from the data sources 170d ... 170 and/or the EDS system 112a ... 112n. The EDS system 112a ... 112n determines which data may be sent to the edge devices 150c ... 150r based on the security level described in the security policy 114a ... 114n.

In certain embodiments, the EDS system 112a ... 112n receives data from the edge devices 150c ... 150r. This data may be data that has been processed by the edge devices 150c ... 150r performing edge computations on the data. This data may be data from the data sources 170d ... 170t that is routed to the EDS system 112a ... 112n by the edge devices 150c ... 150r so that the EDS system 112a ... 112n may perform cloud computations on that data. The data is sent in accordance with the security level described in the security policy 114a ... 114n.

In certain embodiments, the EDS system 112a ... 112n determines when the edge computing has completed, and performs additional processing. For example, the additional processing may be final processing on the data output by the edge devices 150c ... 150r. As another example, the additional processing may be to remove any security updates 116a ... 116n from the edge devices 150c ... 150r.

In certain embodiments, if the security level changes (i.e., is increased or decreased) during the cloud computation and the edge computation, additional and/or different edge devices 150c ... 150r may be selected to continue edge processing. That is, the edge devices 150c ... 150r that are in the participating group are modified.

In certain embodiments, the EDS system 112a ... 112n classifies data using a machine learning model and determines whether to send the data to a particular edge device 150c ... 150r based on the classification of the data.

Figure 4:
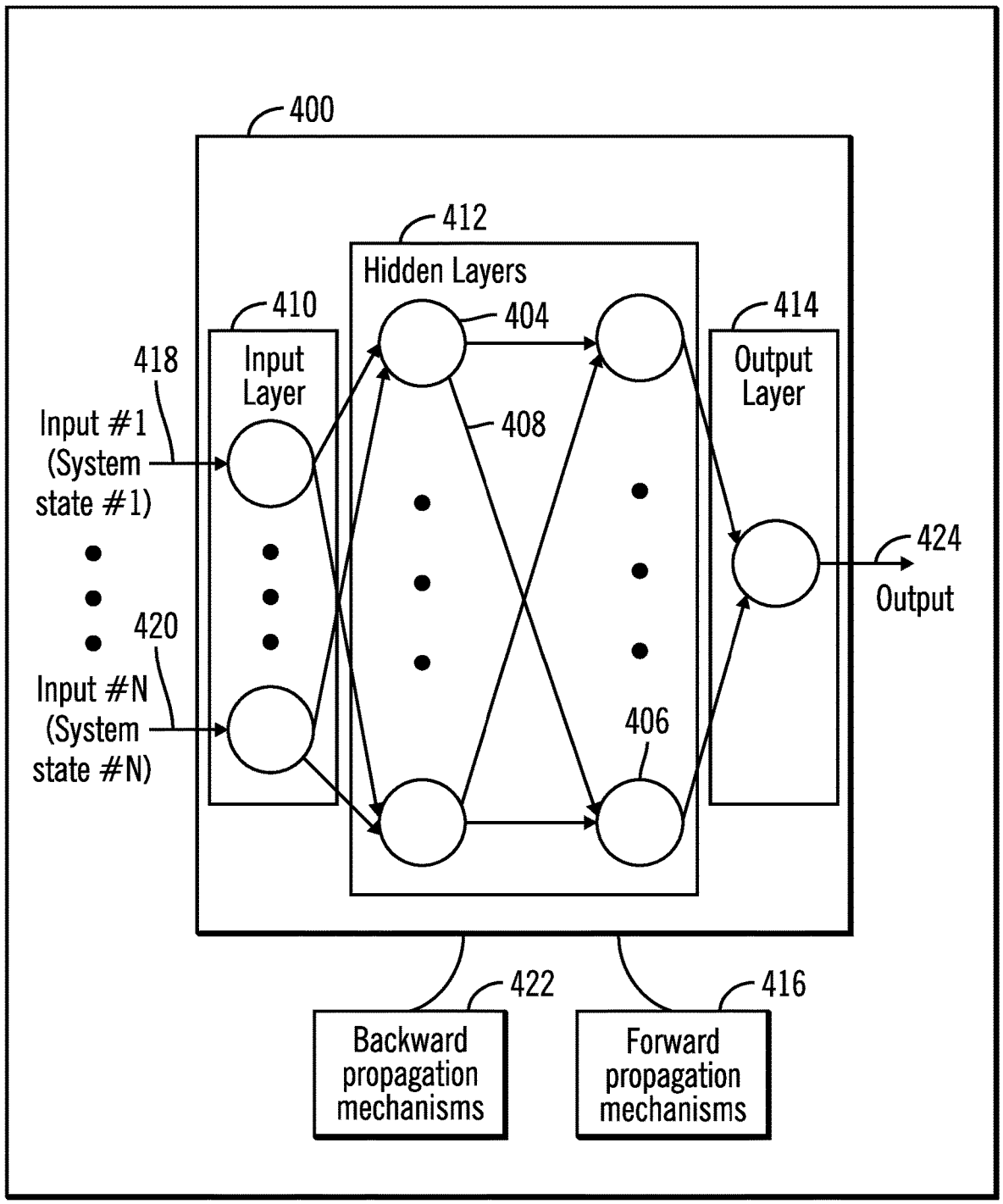
FIG. 4 illustrates, in a block diagram, details of a machine learning module in accordance with certain embodiments.

FIG. 4 illustrates, in a block diagram, details of a machine learning module 400 in accordance with certain embodiments. In certain embodiments, the one or more selection models selection models 118a ... 118n are implemented using the components of the machine learning module 400.

The machine learning module 400 may comprise a neural network with a collection of nodes with links connecting them, where the links are referred to as connections. For example, FIG. 4 shows a node 404 connected by a connection 408 to the node 406. The collection of nodes may be organized into three main parts: an input layer 410, one or more hidden layers 412, and an output layer 414.

The connection between one node and another is represented by a number called a weight, where the weight may be either positive (if one node excites another) or negative (if one node suppresses or inhibits another). Training the machine learning module 400 entails calibrating the weights in the machine learning module 400 via mechanisms referred to as forward propagation 416 and backward propagation 422. Bias nodes that are not connected to any previous layer may also be maintained in the machine learning module 400. A bias may be described as an extra input of 1 with a weight attached to it for a node.

In forward propagation 416, a set of weights are applied to the input data 418 ... 420 to calculate the output 424. For the first forward propagation, the set of weights may be selected randomly or set by, for example, a system administrator. That is, in the forward propagation 416, embodiments apply a set of weights to the input data 418 ... 420 and calculate an output 424.

In backward propagation 422 a measurement is made for a margin of error of the output 424, and the weights are adjusted to decrease the error. Backward propagation 422 compares the output that the machine learning module 400 produces with the output that the machine learning module 400 was meant to produce, and uses the difference between them to modify the weights of the connections between the nodes of the machine learning module 400, starting from the output layer 414 through the hidden layers 412 to the input layer 410, i.e., going backward in the machine learning module 400. In time, backward propagation 422 causes the machine learning module 400 to learn, reducing the difference between actual and intended output to the point where the two come very close or coincide.

The machine learning module 400 may be trained using backward propagation to adjust weights at nodes in a hidden layer to produce adjusted output values based on the provided inputs 418 ... 420. A margin of error may be determined with respect to the actual output 424 from the machine learning module 400 and an expected output to train the machine learning module 400 to produce the desired output value based on a calculated expected output. In backward propagation, the margin of error of the output may be measured and the weights at nodes in the hidden layers 412 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 400 is configured to repeat both forward and backward propagation until the weights of the machine learning module 400 are calibrated to accurately predict an output.

The machine learning module 400 implements a machine learning technique such as decision tree learning, association rule learning, artificial neural network, inductive programming logic, support vector machines, Bayesian models, etc., to determine the output value 424.

In certain machine learning module 400 implementations, weights in a hidden layer of nodes may be assigned to these inputs to indicate their predictive quality in relation to other of the inputs based on training to reach the output value 424.

With embodiments, the machine learning module 400 is a neural network, which may be described as a collection of "neurons" with "synapses" connecting them.

With embodiments, there may be multiple hidden layers 412, with the term "deep" learning implying multiple hidden layers. Hidden layers 412 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 416 and the backward propagation 422.

In backward propagation 422, embodiments measure the margin of error of the output and adjust the weights accordingly to decrease the error.

Neural networks repeat both forward and backward propagation until the weights are calibrated to accurately predict the output 424.

In certain embodiments, the inputs to the machine learning module 400 are one or more security policies 114a . . . 114n and security data 154c . . . 154r of one or more edge devices 150c . . . 150r, and the outputs of the machine learning module 400 are an indication of which of the one or more edge devices 150c . . . 150r has the security level described in the one or more security policies 114a . . . 114n. Then, if an edge device 150c . . . 150r does not have the desired security level, then the appropriate security update may be installed on that edge device 150c . . . 150r to be compliance and participate in edge computing. In certain embodiments, the machine learning model may be refined based on whether the outputted recommendations, once taken, generate positive outcomes.

In certain embodiments, the input to the machine learning module 400 is data, and the outputs of the machine learning module 400 are a classification of the data and a weight assigned to the data.

Figure 5:
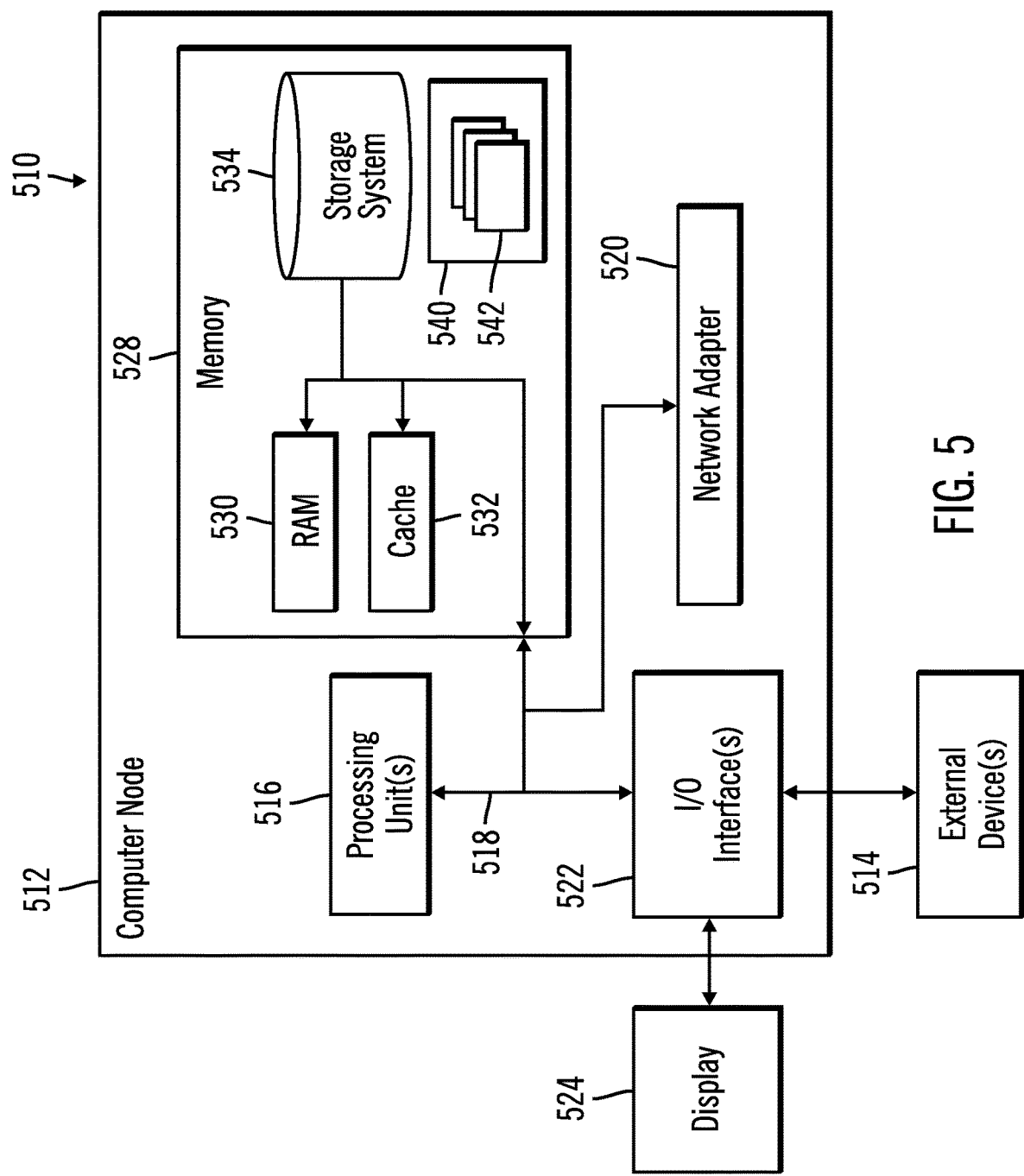
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, Redundant Array of Inexpensive Disks (RAID) systems, tape drives, and data archival storage systems, etc.

In certain embodiments, each of the cloud computing nodes 110a . . . 110n, each of the edge nodes 130b . . . 130p, and each of the edge devices 150c . . . 150r has the architecture of computer node 512.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
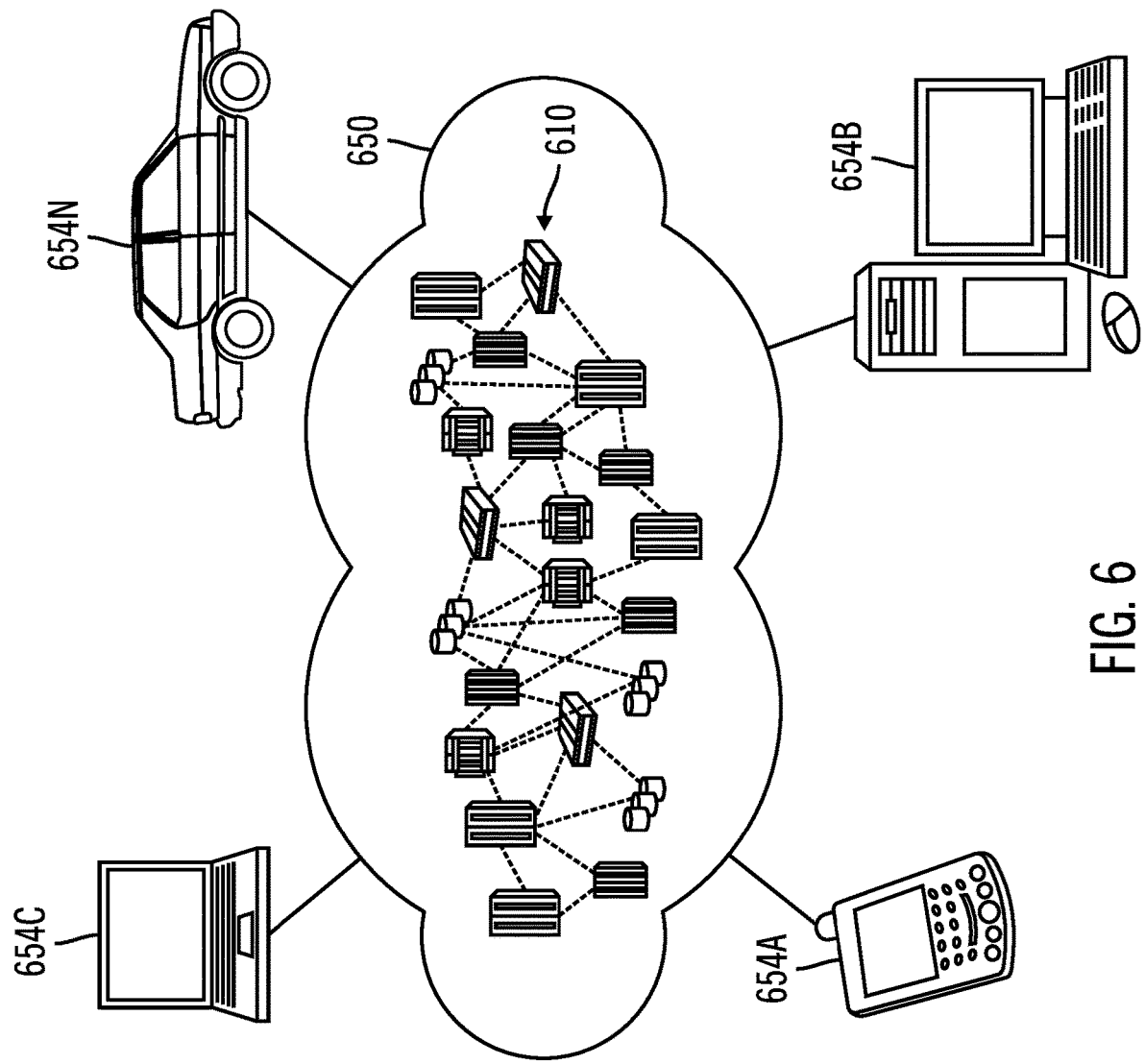
FIG. 6 illustrates a cloud computing environment in accordance with certain embodiments.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
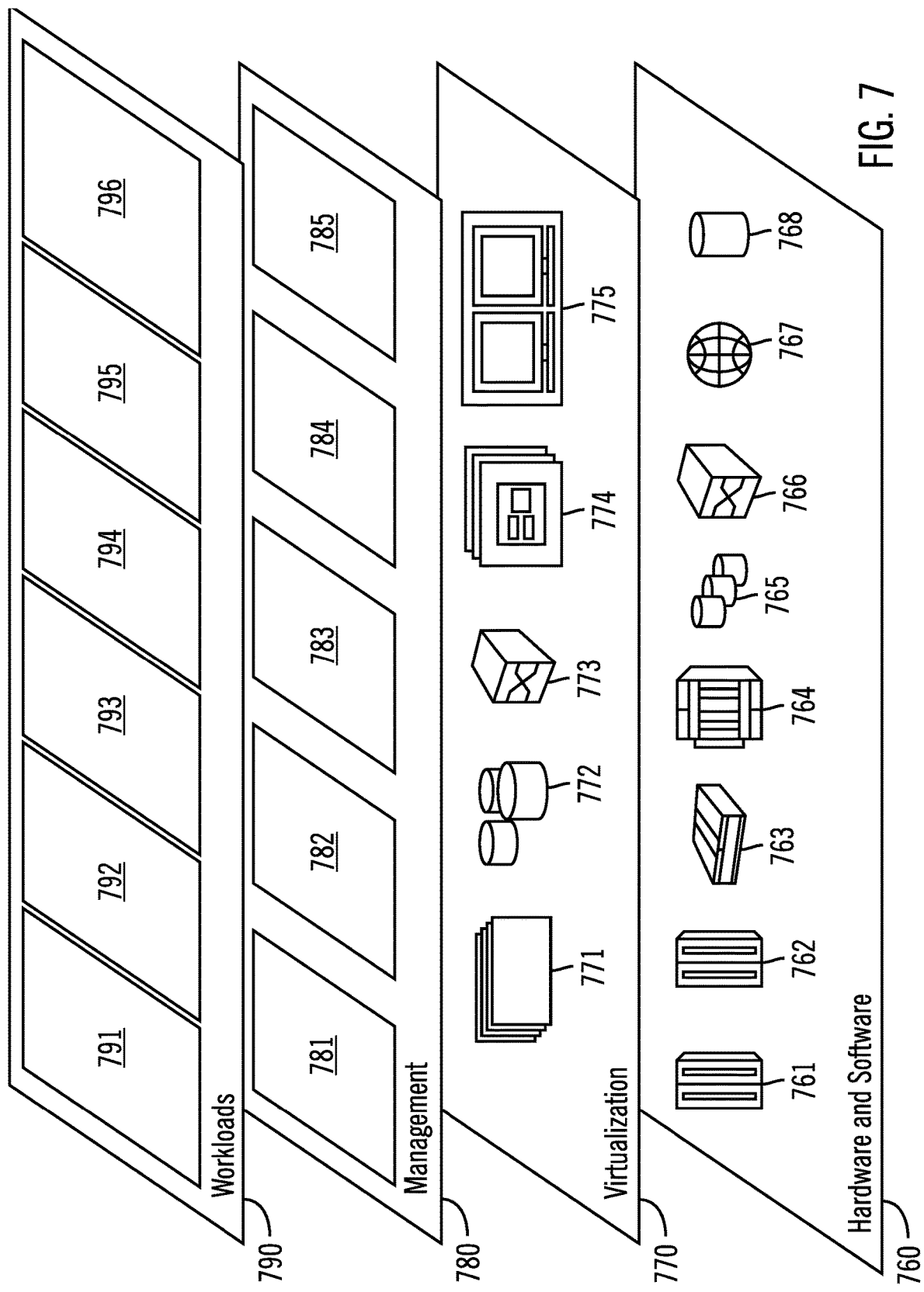
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and performing edge processing by selecting edge devices based on security levels 796.

Thus, in certain embodiments, software or a program, implementing performing edge processing by selecting edge devices based on security levels in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, d, i, n, m, p, r, t, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
  determining that a job that uses one or more cloud nodes and uses edge devices to process data from one or more data sources is to be executed, wherein each of the edge devices comprises security data;
  identifying a security level for the job from a security policy stored at a cloud node of the one or more cloud nodes;
  determining a desired number of the edge devices that are to be included in a participating group to execute the job;
  comparing the security data of each of the edge devices with the security level of the security policy defined at the cloud node;
  determining that a subset of the edge devices meet the security level based on the comparing;
  adding the subset of the edge devices that meet the security level to the participating group;
  determining that the participating group does not include the desired number of the edge devices;
  installing a security update at one or more other edge devices that did not meet the security level to move the one or more other edge devices to the security level and to reach the desired number of the edge devices;
  adding the one or more other edge devices to the participating group; and
  executing the job using the participating group and the one or more cloud nodes.

2. The computer-implemented method of claim 1, wherein installing the security update further comprises operations for:
  sending the security update to one or more edge devices that are not in the participating group; and
  receiving confirmation that the security update has been installed at the one or more edge devices.

3. The computer-implemented method of claim 2, further comprising operations for:
  in response to determining that the edge devices in the participating group have completed edge processing, uninstalling the security update from the one or more other edge devices.

4. The computer-implemented method of claim 1, wherein the security level changes, and further comprising:
  modifying the edge devices that are in the participating group.

5. The computer-implemented method of claim 1, further comprising operations for:
  classifying the data using a machine learning model; and
  determining whether to send the data to a particular edge device in the participating group based on the classification of the data.

6. The computer-implemented method of claim 1, wherein identifying the subset of the edge devices that meet the security level uses a machine learning model.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:
  determining that a job that uses one or more cloud nodes and uses edge devices to process data from one or more data sources is to be executed, wherein each of the edge devices comprises security data;
  identifying a security level for the job from a security policy for the job stored at a cloud node of the one or more cloud nodes;
  determining a desired number of the edge devices that are to be included in a participating group to execute the job;
  comparing the security data of each of the edge devices with the security level of the security policy defined at the cloud node;
  determining that a subset of the edge devices meet the security level based on the comparing;
  adding the subset of the edge devices that meet the security level to the participating group;
  determining that the participating group does not include the desired number of the edge devices;
  installing a security update at one or more other edge devices that did not meet the security level to move the one or more other edge devices to the security level and to reach the desired number of the edge devices;
  adding the one or more other edge devices to the participating group; and
  executing the job using the participating group and the one or more cloud nodes.

9. The computer program product of claim 8, wherein the program code for installing the security update is executable by the at least one processor to perform further operations for:
  sending the security update to one or more edge devices that are not in the participating group; and
  receiving confirmation that the security update has been installed at the one or more edge devices.

10. The computer program product of claim 8, wherein the program code is executable by the at least one processor to perform operations for:
  in response to determining that the edge devices in the participating group have completed edge processing, uninstalling the security update from the one or more other edge devices.

11. The computer program product of claim 8, wherein the security level changes, and wherein the program code is executable by the at least one processor to perform operations for:
  modifying the edge devices that are in the participating group.

12. The computer program product of claim 8, wherein the program code is executable by the at least one processor to perform operations for:
  classifying the data using a machine learning model; and
  determining whether to send the data to a particular edge device in the participating group based on the classification of the data.

13. The computer program product of claim 8, wherein identifying the subset of the edge devices that meet the security level uses a machine learning model.

14. The computer program product of claim 8, wherein a Software as a Service (SaaS) is configured to perform the operations of the computer program product.

15. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to perform operations comprising:

determining that a job that uses one or more cloud nodes and uses edge devices to process data from one or more data sources is to be executed, wherein each of the edge devices comprises security data;

identifying a security level for the job from a security policy stored at a cloud node of the one or more cloud nodes;

determining a desired number of the edge devices that are to be included in a participating group to execute the job;

comparing the security data of each of the edge devices with the security level of the security policy defined at the cloud node;

determining that a subset of the edge devices meet the security level based on the comparing;

adding the subset of the edge devices that meet the security level to the participating group;

determining that the participating group does not include the desired number of the edge devices;

installing a security update at one or more other edge devices that did not meet the security level to move the one or more other edge devices to the security level and to reach the desired number of the edge devices;

adding the one or more other edge devices to the participating group; and executing the job using the participating group and the one or more cloud nodes.

16. The computer system of claim 15, wherein the operations for installing the security update further comprise:

sending the security update to one or more edge devices that are not in the participating group; and receiving confirmation that the security update has been installed at the one or more edge devices.

17. The computer system of claim 15, wherein the operations further comprise:

in response to determining that the edge devices in the participating group have completed edge processing, uninstalling the security update from the one or more other edge devices.

18. The computer system of claim 15, wherein the security level changes, and wherein the operations further comprise:

modifying the edge devices that are in the participating group.

19. The computer system of claim 15, wherein the operations further comprise:

classifying the data using a machine learning model; and determining whether to send the data to a particular edge device in the participating group based on the classification of the data.

20. The computer system of claim 15, wherein a Software as a Service (SaaS) is configured to perform the operations of the computer system.

* * * * *